Oct. 22, 1940.  H. RABEZZANA  2,218,622

THERMOCOUPLE

Filed Oct. 28, 1939

Inventor
Hector Rabezzana
By Blackburn, Spencer & Hick
Attorneys

Patented Oct. 22, 1940

2,218,622

UNITED STATES PATENT OFFICE 2,218,622

THERMOCOUPLE

Hector Rabezzana, Flint, Mich., assignor to General Motors Corporation, Detroit, Mich., a corporation of Delaware Application October 28, 1939, Serial No. 301,792

5 Claims. (Cl. 136—4)

My invention relates to thermocouples of the type designed to screw into a threaded opening in an internal combustion engine in which respect they bear a certain resemblance to spark plugs of conventional form, and the object of my invention is to provide an improved thermocouple of that type such for example as is illustrated in the accompanying drawing and is hereafter described and claimed.

Figure 1:
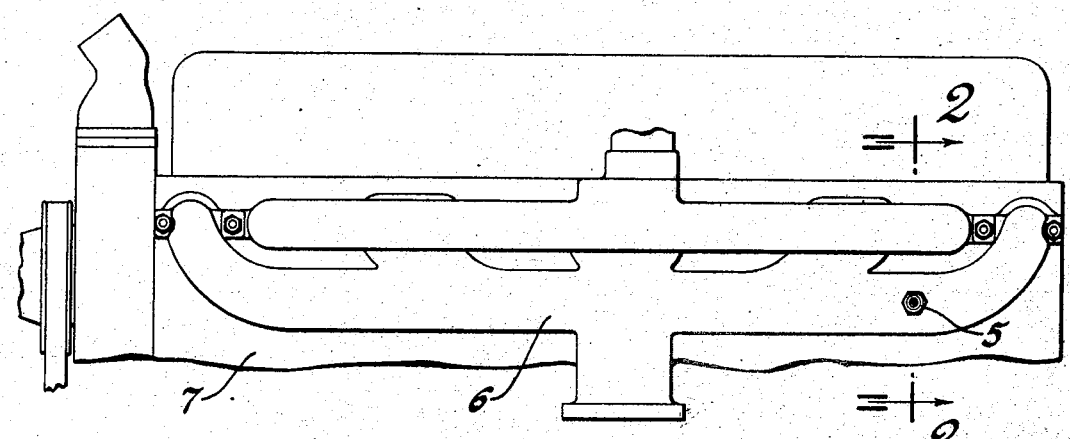
Figure 1 is a view showing a portion of an internal combustion engine in side elevation, and illustrating the way in which my improved thermocouple is installed to measure the temperature of exhaust gases flowing from an engine.
Figure 2:
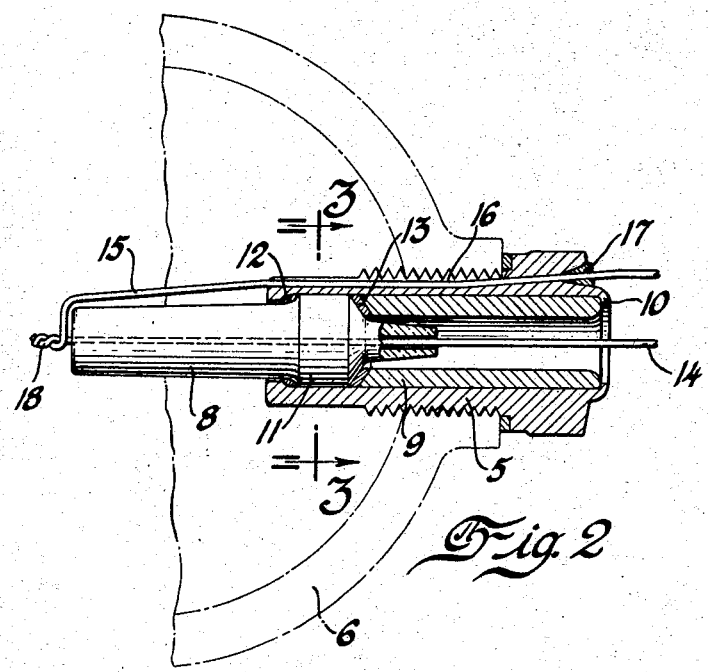
Figure 2 is a view showing my improved thermocouple in section, and upon a larger scale, the position of the plane upon which the section is taken being indicated by the line 2—2, Figure 1.
Figure 3:
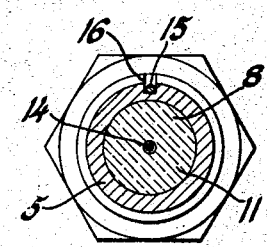
Figure 3 is a view showing a section upon a transverse plane indicated by the line 3—3, Figure 2.

Referring now to the drawing wherein the preferred form of my invention is illustrated, the numeral 5 designates the metallic shell of my improved thermocouple; the same being hollow and tubular in form and having an externally threaded portion to screw into a threaded opening in the exhaust manifold 6, of an internal combustion engine 7 shown conventionally and in side elevation in Figure 1.

Within the shell 5 is a member 8 made of porcelain or equivalent insulating material and which is held in place by a tubular member 9 made preferably of metal, and the inner end of which engages said insulating member; said member 9 being held in place by an inturned flange 10 at the outer end of the shell 5. The insulating member has an enlarged central portion 11 as shown; and suitable yieldable gaskets 12, 13 are provided between the insulating member and the shell to prevent injury to said member as the parts are assembled.

The insulating member 8 has a central longitudinally extending passage through which a wire 14 of constantan or equivalent material extends, while the second element of the thermocouple consists of an iron wire 15 which extends along a longitudinally extending groove or passage 16 in the exterior of the shell 5 and to a point beyond the upper end thereof. The outer end of the passage 16 is made tapering in form, and a conical metallic wedge 17 is driven into said tapered end portion to hold the wire 15 in place relative to the shell and within the groove or passage along which it extends.

The inner ends of the wires 14, 15 which are exposed to the exhaust gas the temperature of which is to be measured, are secured together, as indicated by the numeral 18; and the outer ends thereof lead to the terminals of a millivoltmeter or equivalent instrument for indicating electrical potential, as is usual in the use of thermocouples to indicate the temperature at the joint or junction between dissimilar metals connected together and subjected to heat.

While I have referred to the thermocouple elements or wires 14 and 15 as being of constantan, and of iron, elements of other metals or alloys may be used, so long as an electrical potential will be produced when the junction between the two selected is heated; and it will be appreciated that while the measuring instrument contemplated depends upon potential for its operation, it will commonly be calibrated so that its readings will indicate temperatures in degrees at the junction between the thermocouple elements which are subjected to heat.

Having thus described and explained my invention, I claim and desire to secure by Letters Patent:

1. In a thermocouple, a metallic shell tubular in form and having an externally threaded portion, and a longitudinally extending groove in its periphery; an insulating member within said shell and having a longitudinally extending passage; means for securing said insulating member in place within said shell; and two wires of different materials the inner ends of which are secured together and which wires extend one through the passage in said insulating member, and the other along the groove aforesaid in the periphery of said shell.

2. In a thermocouple, a metallic shell tubular in form and having an externally threaded portion; an insulating member within said shell and having a longitudinally extending passage; a tubular member within said shell and the inner end of which engages said insulating member, and which tubular member is held in place by an inturned flange at the outer end of said shell; and two wires of different materials the inner ends of which are secured together and one of which extends through the passage in said insulating member, and the other of which extends along said shell and beyond the outer end thereof.

3. In a thermocouple, a metallic shell tubular in form and having an externally threaded portion, and a longitudinally extending groove the outer end of which is tapering in form; an insulating member within said shell and having a longitudinally extending passage; means for securing said insulating member in place within said shell; two wires of different materials the inner ends of which are secured together and which wires extend one through the passage in said insulating member, and the other along the groove aforesaid and beyond the outer end of said shell; and a conical wedge within the tapered outer end of said groove for holding one of said wires in place within said groove.

4. In a thermocouple, a metallic shell tubular in form and having an externally threaded portion, and a longitudinally extending groove the outer end of which is tapering in form; an insulating member within said shell and having a longitudinally extending passage; a tubular member within said shell and the inner end of which engages said insulating member, and which tubular member is held in place by an inturned flange at the outer end of said shell; two wires of different materials the inner ends of which are secured together and which wires extend one through the passage in said insulating member, and the other along the groove aforesaid and beyond the outer end of said shell; and a conical wedge within the tapered outer end of said groove for holding one of said wires in place within said groove.

5. In a thermocouple, a metallic shell tubular in form and having an externally threaded portion, and a longitudinally extending groove; an insulating member within said shell and having a longitudinally extending passage; means for securing said insulating member in place within said shell; two wires of different materials the inner ends of which are secured together and which wires extend one through the passage in said insulating member, and the other along the groove aforesaid and beyond the outer end of said shell; and a wedge within the outer end of said groove for holding one of said wires in place within said groove.

HECTOR RABEZZANA.